March 31, 1964  J. H. BENT  3,126,766

FLUID PRESSURE ACTUATED POSITIVE FEED TOOL

Filed May 16, 1960  5 Sheets-Sheet 1

INVENTOR.
JOHN H. BENT
BY *Peter J. Murphy*
ATTORNEY

March 31, 1964   J. H. BENT   3,126,766
FLUID PRESSURE ACTUATED POSITIVE FEED TOOL
Filed May 16, 1960   5 Sheets-Sheet 2
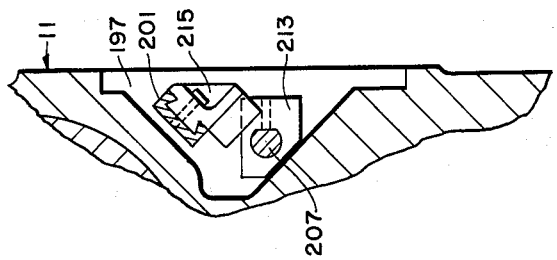
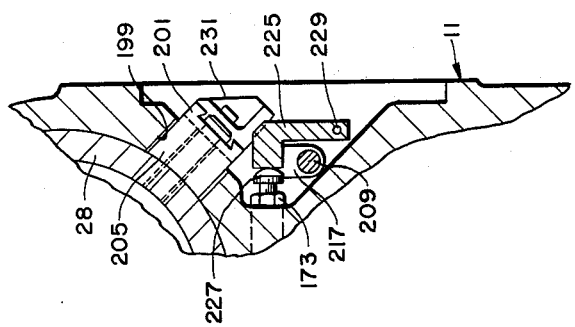
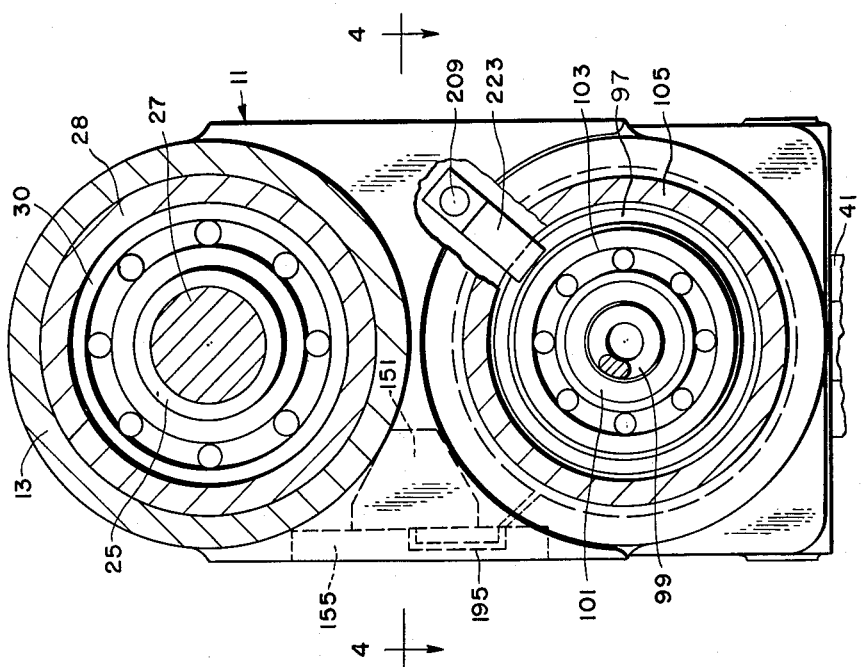
INVENTOR.
JOHN H. BENT
BY Peter J. Murphy
ATTORNEY

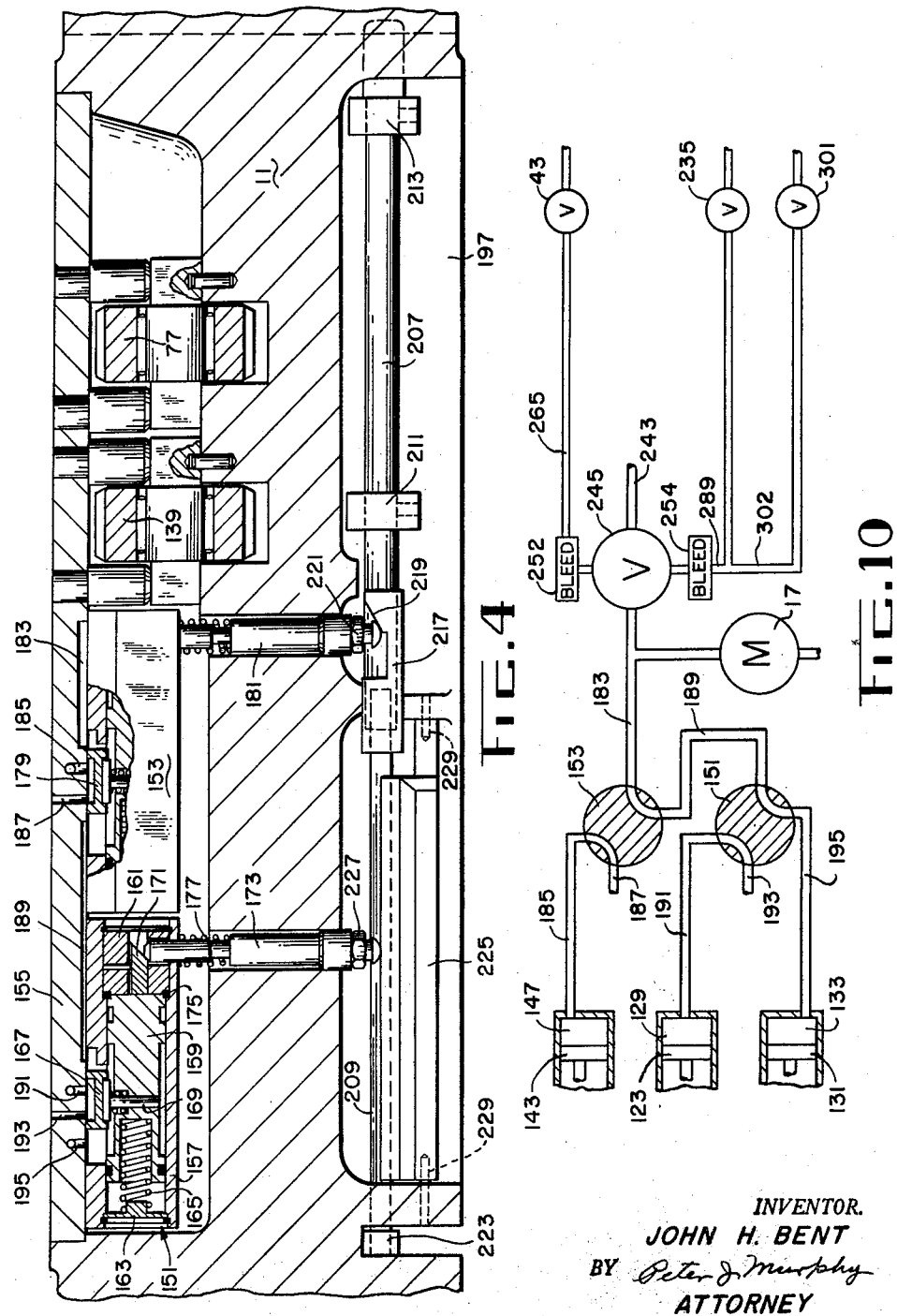

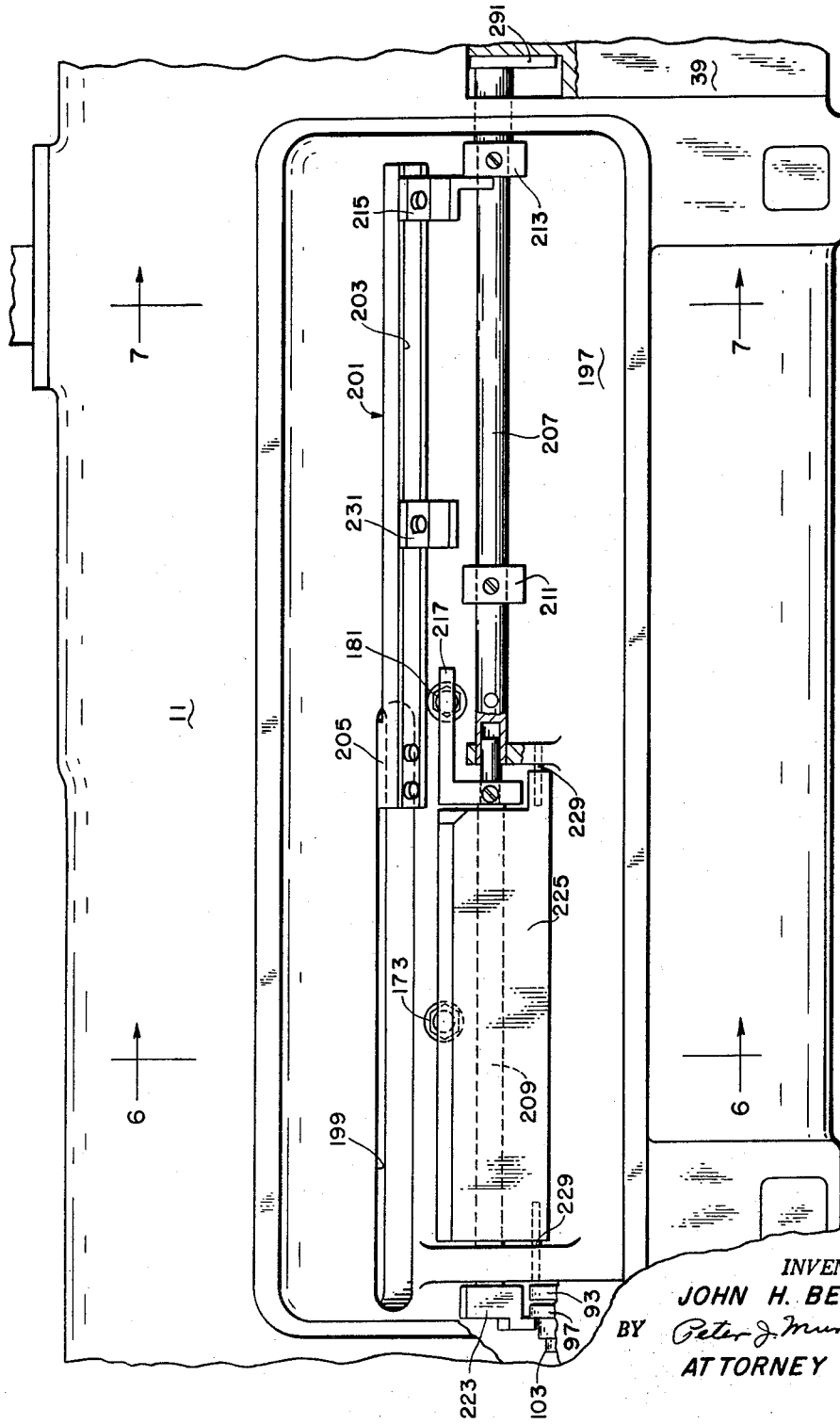

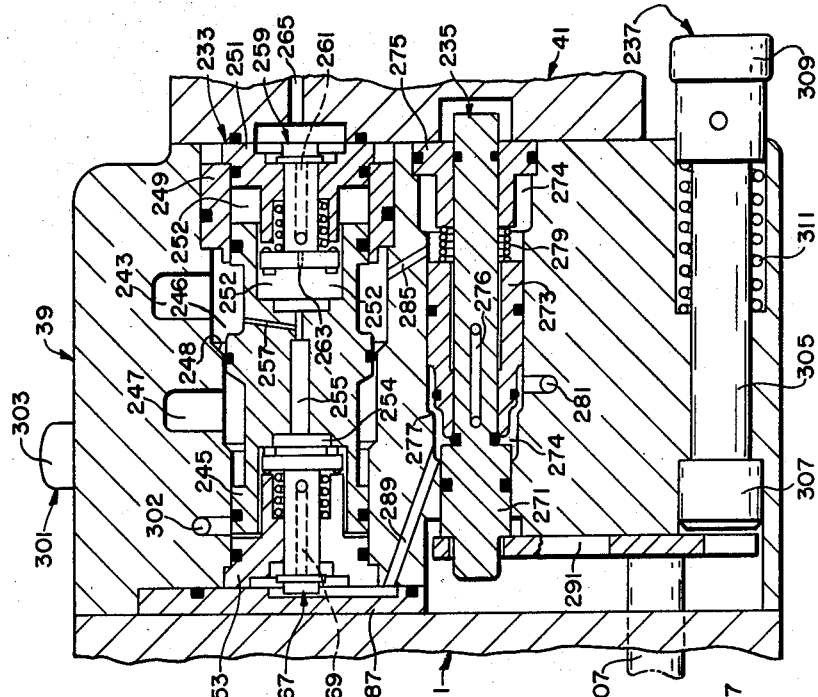

United States Patent Office 3,126,766
Patented Mar. 31, 1964

3,126,766
FLUID PRESSURE ACTUATED POSITIVE FEED TOOL
John H. Bent, Fullerton, Calif., assignor to Gardner-Denver Company, a corporation of Delaware
Filed May 16, 1960, Ser. No. 30,046
7 Claims. (Cl. 77—32.7)

The present invention relates generally to tools of the type intended for performing drilling and allied operations and more particularly to such tools which are effective not only to drive a rotary cutting element but also to impart feed and return movements thereto with respect to a workpiece.

In performing drilling or similar operations on materials of the so-called work-hardening type, the materials tend to increase in hardness ahead of the drill or other cutting element being used. In order to successfully perform such operations on these materials, not only must the cutting element be rotated but also it must be positively advanced with respect to the work so that removal of the material of the work is insured.

Pressure fluid operated tools possess numerous features that make their employment especially advantageous in an almost infinite number of applications, among which features are included their comparatively small size, light weight, durability, ease of control and safety. Each of these features has contributed to the wide use of portable tools of this type in the so-called temporary tooling practice which has been widely adopted by industry where frequent design changes make uneconomical the utilization of permanent, special-purpose machine tools.

Accordingly, it is a general object of the present invention to provide, in a portable pressure fluid operated tool, simple and reliable means for positively effecting longitudinal or feed and return movement of the tool's spindle, as well for rotating the same, substantially independently of the resistance to such movement offered by the work and at a predetermined rate and thrust.

Another object is to provide a self-contained pressure fluid operated tool having an improved power transmitting mechanism which is effective not only to rotate its spindle and a cutting element mounted thereon but which also is effective to feed and return the spindle positively.

A further object of this invention is to provide a self-contained tool having an improved control mechanism operated by pressure fluid to positively control rapid advance, feed, and return movements of the tool spindle. The rapid advance feature is desirable, from the standpoint of reduced operating time, in applications where the cutting element must move forward an appreciable distance before engaging the workpiece.

A still further object of this invention is to provide a portable self-contained tool having a change speed mechanism for providing two speeds of operation, which effect both the speed of rotation of the cutting element and the rate of movement of the cutting element.

In drilling the above mentioned work hardened materials, should the cutting element become dull, cutting will cease and an increased thrust reaction to feed of the cutting element will occur. Due to the positive feed characteristic of the tool, this might result in a damaged workpiece, a broken cutting element, a damaged tool, or a damaged fixture. It is desirable then to provide a thrust control to retract the cutting element from the workpiece in response to a predetermined thrust reaction at the cutting element. Accordingly, it is a further object of this invention to provide a portable self-contained tool providing positive feed of the cutting element, and providing for automatic retraction of the cutting element in response to a predetermined thrust reaction to the advance of the cutting element.

A still further object of this invention is to provide a self-contained, fluid pressure actuated, portable tool which is particularly adapted for remote control operation.

The novel features of the invention, as well as additional objects and advantages thereof, will be understood more fully from the following description when read in connection with the accompanying drawings, in which:

FIGURE 3 is a transverse sectional view, taken along the line 3—3 of FIGURE 1 looking in the direction of the appended arrows, showing a portion of the thrust control mechanism.

FIGURE 4 is a partial longitudinal sectional view, taken along the line 4—4 of FIGURE 3 looking in the direction of the appended arrows, showing the control valves and a portion of the control mechanism.

FIGURE 5 is a partial side elevation showing the control mechanism.

FIGURE 6 is a fragmentary sectional view, taken along the line 6—6 of FIGURE 5 looking in the direction of the appended arrows.

FIGURE 7 is a fragmentary sectional view, taken along the line 7—7 of FIGURE 5 looking in the direction of the appended arrows.

FIGURE 8 is a longitudinal sectional view, taken along the line 8—8 of FIGURE 1 looking in the direction of the appended arrows, showing the main control valves for the tool in shut off condition.

FIGURE 9 is a view similar to FIGURE 8 showing the valves in operating condition.

FIGURE 10 is a diagrammatic view of the air circuit for operating the tool.

Referring now to the accompanying drawings, a particular tool is described which embodies the present invention. The tool is entirely operated and controlled by a pressure fluid, preferably air, along with mechanical movements of the tool components.

Figure 1:
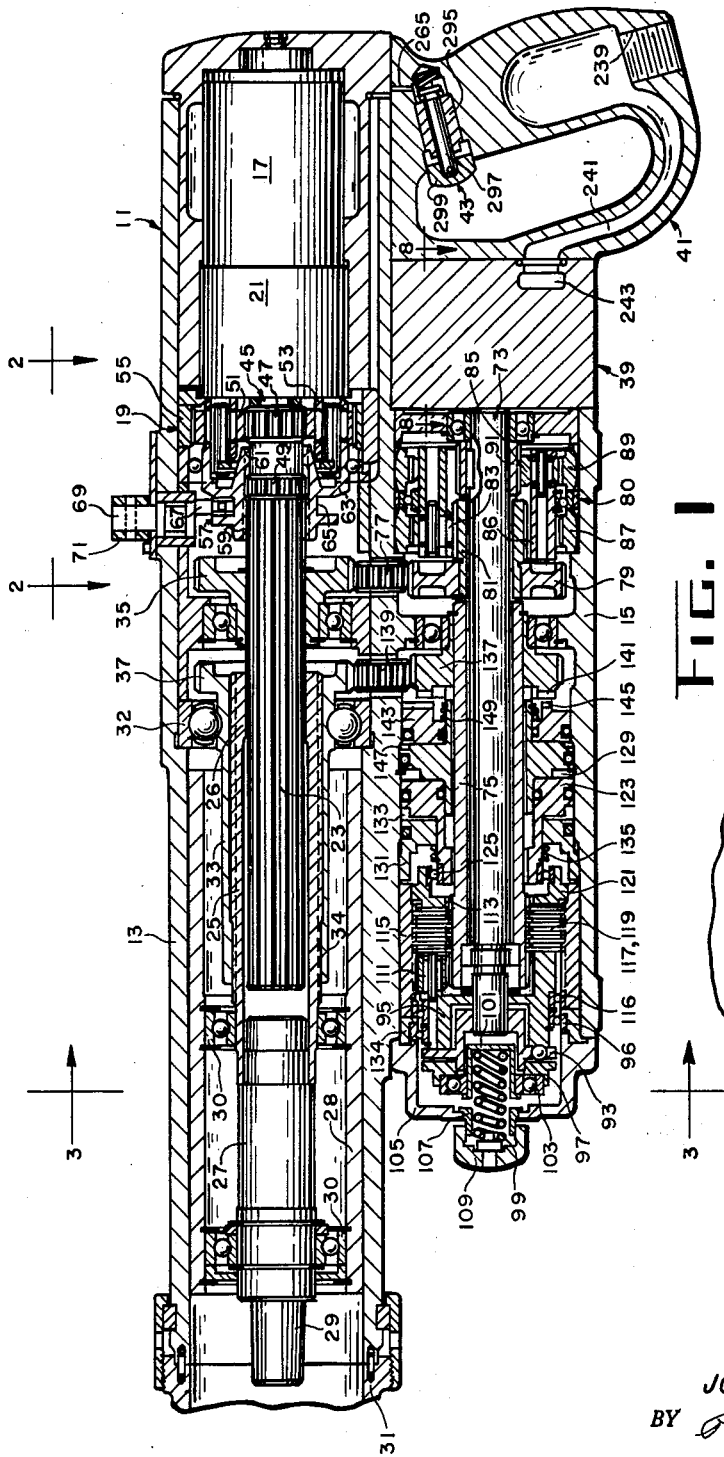
FIGURE 1 is a longitudinal sectional view, partially broken away, of a tool embodying the present invention.

The mechanical configuration of driving elements of the tool are shown in FIGURE 1, in which the forward end of the tool is shown to the left. The driving elements are substantially entirely contained in a housing 11 comprising generally an upper barrel 13 and a lower barrel 15. Within the upper barrel is provided a driving motor 17, which may be a conventional rotary vane air motor, to provide power to a gearshift mechanism 19, through a conventional planetary reduction mechanism 21. The output of the gearshift mechanism 19 is directly connected to a splined driveshaft 23. A hollow screw 25, having an internal spline 26, is telescoped in driving relation over the driveshaft 23. A spindle 27 is fixed to the screw 25 for rotation thereby and includes a taper 29 at its forward end, to which may be attached a suitable chuck (not shown) for mounting a drill or other cutting element. The spindle is rotatably mounted within a quill sleeve 28 by means of bearings 30. The quill sleeve 28 is movable longitudinally within the housing. A nosepiece 31 is attached to the forward end of the upper barrel of the housing 11 and may have, at its forward end, means for mounting a supporting bushing of a known type (not shown) by means of which the entire tool may be supported in a fixture by its nose.

The lower barrel 15 of the housing 11 contains a spindle feed control mechanism which controls the longitudinal movements of the spindle and which will be described subsequently. The longitudinal movements include a rapid forward movement of the spindle hereafter referred to as "advance," a slow forward movement of the spindle hereafter referred to as "feed," and a rearward or reverse movement of the spindle hereafter referred to as "return." These movements of the spindle are effected by means of a sleeve 33 having an internal threaded portion 34 which is continuously engaged with the screw 25. The sleeve 33 is fixed against longitudinal movement within the housing 11, by means of bearing 32. The several movements of the spindle are determined by the relative speed of rotation of the sleeve 33 with respect to the screw 25. The screw 25 is rotated at constant speed, as determined by the speed of the motor 17 and the selected position of the gear shift mechanism 19. The speed of rotation of the sleeve 33 is controlled through the spindle feed control mechanism, which receives input power from feed drive gear 35 fixed to the driveshaft 23 and which delivers power to a gear 37 integral with the sleeve 33 at its rearward end.

Certain control elements of the tool are mounted in the sides of the housing between the barrels 13 and 15. Behind the lower barrel portion 15 is a valve block 39 containing certain control valves of the tool which will be described. A handle assembly 41 containing a start valve 43 is mounted behind the manifold block 39.

Referring now in detail to the spindle rotation assembly, and particularly to the gearshift mechanism 19, a gearshift shaft 45 is driven directly from the speed reduction mechanism 21. This shaft includes an integral gear 47, adjacent its rearward end, and an external spline 49, at its forward end, longitudinally spaced from the gear 47 by a reduced diameter portion. The gear 47 meshes with idler gears 51 rotatably carried in a cage 53. The idler gears 51 mesh with a ring gear 55 fixed in the housing 11. The rearward end of the spline driveshaft 23 abuts the splined forward end of the gearshift shaft 45. A clutch shift plate 57 includes a bore which receives the ends of the shafts 23 and 45 and which is provided with a forward internal spline 59 and a rearward internal spline 61 longitudinally separated by an enlarged diameter portion which bridges the spline 49 of the shaft 45. The forward spline 59 of the clutch shift plate is in continuous splined engagement with the shaft 23. The rearward spline 61 of the clutch shift plate may or may not be in splined engagement with the spline 49 of the shaft 45, depending on the longitudinal position of the clutch shift plate. The clutch shift plate is provided with an annular flange 63 having rearward facing teeth for engagement with complementary forward facing teeth provided on the forward end of the cage 53.

Figure 2:
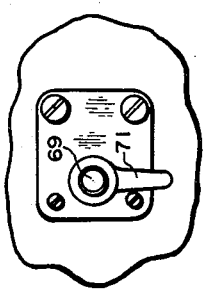
FIGURE 2 is a fragmentary plan view, taken along the line 2—2 of FIGURE 1 looking in the direction of the appended arrows, showing the control for the two-speed clutch.

The clutch shift plate is further provided with an annular groove 65, which receives an eccentric arm 67 of a gearshift control shaft 69. The shaft 69 is rotatably mounted in the housing 11 and is rotated by means of a shift lever 71 pinned to the shaft 69. In the drawing (see FIGS. 1 and 2) the shift lever 71 is rotated to the low speed position in which the clutch shift plate 57 is in a rearward position. In this position, the teeth on the flange 63 are engaged with those on the cage 53, and the rearward spline 61 of the gearshift plate is positioned to the rear of, and out of engagement with, the spline 49 of the shaft 45. In this position the clutch shift plate is driven through the cage 53, and drives the driveshaft 23 through its spline connection with the driveshaft. When the shift lever 71 is rotated to the high speed position, the clutch shift plate 57 is moved to a forward position which disengages the respective teeth of the clutch shift plate and the cage and engages the rearward spline 61 of the clutch shift plate with the spline 49 of the shaft 45. Then the driveshaft 23 is directly coupled to the shaft 45 through the clutch shift plate. Since the feed drive gear 35, which provides input power to the spindle feed control mechanism, is fixed to the driveshaft 23, the above described speed change mechanism provides two speeds of operation for the entire tool; that is, it changes the speed of rotation of the spindle, and therefore the cutting element, and it correspondingly changes the rates of longitudinal movement of the spindle which are controlled through the spindle control mechanism.

The spindle control mechanism includes a feed driveshaft 73 and a hollow feed output shaft 75 mounted concentric with the feed driveshaft. The feed drive gear 35, which is fixed to the driveshaft 23, drives idler gear 77 which in turn drives a gear 79 keyed to pinion 81 which is rotatably mounted on the feed driveshaft 73. The pinion 81 drives idler gears 83 of a double planetary system 80, which includes idler gears 85 rotatably carried in a common cage 86 with idler gears 83 and meshing with fixed ring gears 87 and 89. The idler gears 85 mesh with pinion 91 which is keyed to the feed driveshaft 73. Hence, the feed driveshaft 73 is directly driven by the driveshaft 23 through the feed drive gear 35 and the planetary system 80.

A torque clutch mounted at the forward end of the lower barrel includes a clutch driver 93 nonrotatably fixed to the forward end of the feed driveshaft 73. The clutch driver drives a rapid advance planetary cage 95, rotatably mounted in thrust bearing 96, by means of a ball clutch drive. The balls are retained in openings in a radial flange of the clutch driver and are urged rearwardly into recesses in the forward face of the rapid advance cage 95 by a clutch plate 97. The clutch plate is biased rearwardly by means of a spring 99, the rearward end of which seats in a spring retainer 101 rotatably mounted with respect to the clutch plate by means of a thrust bearing 103. An end cap 105, mounted at the forward end of the lower barrel of the housing 11, includes a forwardly extending threaded nipple 107 upon which is threaded an adjustment nut 109. The forward end of the spring 99 is retained by the adjustment nut 109 and, by means of adjustment nut, the compression force of the spring bearing against the clutch plate 97 may be adjusted. This mechanism defines a torque clutch which acts to control the return of the tool spindle, in response to the thrust reaction, in a manner which will be described subsequently.

The rapid advance cage 95 rotatably supports idler gears 111 which mesh with a gear 113, integral with the feed output shaft 75, at its forward end, and a ring gear 115 which is rotatably mounted with respect to the cage 95 by bearing 116. A disc clutch comprises outer clutch plates 117, mounted on the ring gear 115, and intermeshing inner clutch plates 119, mounted on the feed output shaft gear 113. A clutch clamping ring 121, is positioned at the rearward end of the disc clutch assembly for compressing the clutch plates into frictional engagement against the rearward face of the rapid advance cage 95. The clamping ring 121 is moved forwardly by a piston 123 through a thrust bearing 125. The cage thrust bearing 96 opposes the compressive force of the piston 123. Air directed to a chamber 129, to the rear of piston 123, moves the piston 123 forward to engage the disc clutch above described.

A piston 131, mounted concentrically with the piston 123, includes a forwardly extending flange which bears against the ring gear 115. Air directed to a chamber 133, to the rear of the piston 131, moves the piston 131 forward to frictionally engage the ring gear against housing member 134 to prevent rotation of the ring gear. Air to the chamber 133 also reacts against the forward face of the piston 123 to move this piston rearwardly to disengage the disc clutch. A spring 135 is provided for maintaining the piston 131 in its rearward position when it is not urged forward through the introduction of air to the chamber 133.

A return clutch gear 137 is keyed to the rearward end of the feed output shaft 75 and drives the gear 37 and sleeve 33 through an idler gear 139. The gear 137 includes an annular forward facing boss provided with a forward facing teeth 141. A piston 143, mounted for nonrotative movement within the housing, includes a rearward facing boss provided with rearward facing complementary teeth 145. Air admitted to a chamber 147, forward of the piston 143, moves the piston rearward to effect engagement of the teeth 141 and 145 to prevent rotation of the gear 137 and therefore of the sleeve 133. A spring 149 biases the piston 143 to a forward position in which the teeth are disengaged.

The mechanical operation of the spindle feed control mechanism is as follows: The motor 17, through the gear reduction mechanism 21 and gearshift mechanism 19, drives the screw 25 and the spindle 27 at a fixed speed of rotation. The motor also drives the feed driveshaft 73 at a fixed speed of rotation through the above mechanism and through the planetary system 80. The clutch driver 93 and the rapid advance cage 95 are rotated with the feed driveshaft. For "advance" movement of the spindle, the sleeve 33 is to be rotated considerably faster than the screw 25. This is accomplished by directing air to the chamber 133 which moves the piston 131 forward to prevent rotation of the ring gear 115. At the same time, the piston 123 is urged rearwardly to disengage the disc clutch 117, 119. The cage 95 then drives the feed output shaft 75 through the planetary system consisting of the ring gear 115, idler gears 111 and the feed output shaft gear 113. The feed output shaft 75 is then rotating considerably faster than the feed input shaft 73.

For "feed" movement of the spindle, the sleeve 33 is to be rotated at a slower rate, yet somewhat faster than the screw 25. This is accomplished by directing air to the chamber 129 which urges piston 123 forward to engage the disc clutch 117, 119 thereby effectively locking together feed output shaft 75 and the ring gear 115. Simultaneously air is exhausted from the chamber 133 and the piston 131 is urged rearwardly by the spring 135 to permit rotation of the ring gear 115. The idler gears 111 cannot now rotate and the cage 95 drives the assembly of the ring gear 115 and the feed output shaft 75 at the same speed as the feed input shaft 73. The speed differential between the screw 25 and the sleeve 33 is now provided by the planetary system 80.

For "return" movement of the spindle, the sleeve 33 is to be rotated slower than the screw 25. This is accomplished by directing air to the chamber 147 to move the piston 143 rearwardly to engage its teeth 145 with the teeth 141 of the return clutch gear 137. Since the piston 143 is fixed against rotation within the housing, the return clutch gear is prevented from rotating and the sleeve 33 is also prevented from rotating. Relatively, then, the sleeve 33 is rotated much slower than the screw 25. Simultaneously the chamber 129 is exhausted to permit disengagement of the disc clutch 117, 119. Since the feed output shaft 75 is prevented from rotating, the cage 95 merely rotates the ring gear 115 through the idler gears 111.

From the foregoing description, it is clear that the longitudinal movements of the spindle are positive. It should be further noted that the rate of feed of the spindle is constant per revolution of the spindle; that is, the speed of rotation of the spindle and the rate of feed of the spindle have a constant, predetermined relationship.

FIGURE 4 shows the arrangement of the control valves for directing air to and exhausting air from the above discussed piston chambers of the spindle feed control mechanism. An advance-feed valve 151 is a form of four-way valve which controls the "advance" and "feed" movements of the spindle. A forward-return valve 153 is an identical valve which controls the forward (advance or feed) and "return" movements of the spindle. These valves operate in series as will be seen. The two valves are mounted on a valve plate 155 which provides a seat for the valve bodies and also provides for distribution of air to and from the valves.

The advance-feed valve 151 will be described in detail and includes a housing 157 having a generally cylindrical chamber in which a valve spool 159 reciprocates. At the right end of the valve housing (as seen in FIGURE 4) a cap 161 seals the end of the chamber. At the left end of the housing a retainer 163 closes the left end of the housing and supports a spring 165 which biases the valve spool 159 against the cap 161. The retainer is provided with a bleed opening to prevent entrapment of air between the retainer and the valve spool. A valve body 167 is a disc-shaped member having recesses on both faces. One recess faces the valve plate 155, on which the valve body rides, and communicates selected passages as will be described. A headed pin 169 is carried in a transverse bore in the valve spool 159 in a manner such that the head thereof rides within the other recess of the valve body 167. A coil spring biases the pin out of the valve spool in a manner to bias the valve body against the valve plate 155. A suitable opening is provided in the valve housing 157 to permit the valve body 167 to engage the valve plate. It will be seen that reciprocating movement of the valve spool 159 reciprocates the valve body 167 with respect to the valve plate.

The cap 161 is provided with an axial bore in which is mounted a trip pin 171. The left end of the pin projects through the bore to bear against the valve spool and the right end of the pin is provided with a bevel. The trip pin is prevented from rotation in the cap by means of a pin key. A trip plunger 173 is mounted in a transverse bore in the tool housing and one end of this plunger is beveled and projects into the valve housing to engage the beveled end of the trip pin 171. It will be seen that if the trip plunger 173 is moved into the valve housing, the reaction on the beveled face of the trip pin 171 will move that pin to the left to unseat the valve spool 159 from the valve cap 161. An O-ring 175, mounted on the cap 161, provides a seat or seal to prevent air within the valve chamber from passing to the right end face of the valve spool. The valve spring 165 tends to hold the valve spool seated against the cap and a coil spring 177, on the trip plunger 173, biases the plunger away from the trip pin so that the valve spool will not be unseated until it is positively actuated.

Since the forward return valve 153 is identical in structure, the parts are not identified except for the valve body 179 and the trip plunger 181.

Referring now particularly to the valve plate 155, a passage 183 communicates with a motor valve, to be described, from which live air is directed; a passage 185 communicates the forward-return valve with the chamber 147 of the spindle feed control mechanism; a passage 187 communicates the forward-return valve to atmosphere; a passage 189 communicates the forward-return valve with the advance-feed valve; a passage 191 communicates the advance feed valve with the chamber 129 of the spindle feed control mechanism; a passage 193 communicates the advance-feed valve to atmosphere; and a passage 195 communicates the advance feed valve with the chamber 133 of the spindle feed control mechanism.

The two control valves 151 and 153 are shown in the positions maintained when no air is directed to the valves. The valve body 179 of the forward-return valve communicates the passages 185 and 187 so that the chamber 147 is exhausted. Air directed to the forward-return valve, through the passage 183, is directed through this valve to the advance-return valve, through the passage 189. The valve body 167 of the advance-feed valve communicates the passages 191 and 193 so that the chamber 129 is exhausted. Air directed to the advance-feed valve, through the passage 189, is directed through the passage 195 to the chamber 133 to move piston 131 forward. Rotation of the ring gear 115 is then prevented and the spindle feed control mechanism is in condition for "advance." Since the motor valve, to be described, directs air to the motor and to the control valves simultaneously, as soon as the motor valve is actuated, the spindle begins to rotate and to advance.

The air pressure within the two control valves 151 and 153 is not effective to move the respective valve spools in either direction, due to balanced piston areas. When the spindle has moved forward a predetermined distance, the trip plunger 173 of the advance-feed valve 151 is actuated by a mechanism, to be described, and this actuates the trip pin 171 to move the valve spool 159 away from the cap 161. As soon as the valve spool is moved slightly away from the cap, the pressurized air within the valve chamber communicates with the end face of the valve spool and shifts the valve spool and the valve body 167 to the left against the pressure of the spring 165. So long as air is directed to this valve, the valve spool will remain in this position. The valve body 167 now communicates passages 193 and 195 to exhaust the chamber 133 and live air is now directed through passage 191 to the chamber 129 to actuate the piston 123. This releases the ring gear 115 for rotation and engages the disc clutch 117, 119 so that the spindle feed control mechanism is in "feed" condition.

When the spindle 27 reaches the end of its stroke, the trip plunger 181 of the forward-return valve is actuated, by a mechanism to be described, to shift the valve spool and the valve body 179 to the left. The valve body 179 now communicates passages 187 and 189 and air is exhausted from the advance-feed valve 151. Since air is entirely removed from this valve, the valve spool 159 will again be shifted to the right by the spring 165. Regardless of the position of the valve body 167, however, both of the passages 191 and 195 are communicated with atmosphere so that both chambers 129 and 133 are exhausted. Air is now directed, by the forward-return valve, through the passage 185 to the chamber 147 to actuate the piston 143. Rotation of the return clutch gear 147 and the sleeve 33 is now prevented and the spindle feed control mechanism is in return condition. The forward-return valve will remain in the shifted condition until the tool completes its cycle and air is shut off at the motor valve.

The mechanical assembly for operating the above-described control valves, and for performing other functions to be described, is illustrated particularly in FIGS. 4, 5, 6 and 7. This assembly is located in a housing recess 197 positioned at the side of the tool intermediate the two housing barrels. A longitudinal slot 199 communicates the recess 197 with the upper barrel 13. A trip bar 201 comprises an elongated bar having a longitudinal dove tail groove 203. A boss 205 provided at the forward end of the trip bar extends through the slot 199 and is attached to the quill sleeve 28. Since the quill sleeve moves with the tool spindle, the trip bar also moves longitudinally with the tool spindle.

A trip rod 207 is supported for limited reciprocating movement within the housing generally below the trip bar 201. A return rod 209 is also mounted for limited reciprocating movement within the housing, axially forward of the trip rod. The two rods are joined, at the center of the recess 197, by means of a lost motion connection wherein the return rod 209 is received within an end recess in the trip rod 207. The lost motion connection is provided so that the return rod may be moved forwardly independently of the trip rod, the trip rod may be moved rearwardly independently of the return rod, but that forward movement of the trip rod will effect forward movement of the return rod.

A reversing trip 217 comprises an L-shaped member pinned to the return rod adjacent its rearward end. A longitudinal extension of the reversing trip includes an inclined cam surface 219 which is positioned to engage the trip plunger 181 of the forward-return valve 153. A lock nut and screw assembly 221 is provided on the trip plunger 181 for the purpose of fine adjustment of the length of the trip plunger with respect to the reversing trip 217 and the valve trip pin. The reversing trip is suitably guided for precise reciprocating movement. A thrust control trip 223 is pinned to the forward end of the return rod 209 and comprises a stepped arm which extends into the lower housing barrel 15 and engages the forward face of the clutch plate 97.

A return stop 211 comprises a collar which may be secured at any desired position on the trip rod 207 by means of a set screw. A shut-off stop 213 comprises a similar collar which may be secured at any desired position on the trip rod by means of a set screw. Both of these stops are positioned to be engaged by a stroke trip 215 which is secured at the rearward end of the trip bar 201 in the dove tail slot. The trip 215 is secured in a manner such that it is not adjustable. It will now be seen that as the spindle 27 moves forward, carrying with it the trip bar 201, the forward limit of the stroke is determined by the position of the return stop 211 which is engaged by the stroke trip 215. When this engagement occurs, the trip bar 207 is moved forward and moves the return rod 209 forward carrying with it the reversing trip 217. The reversing trip actuates the trip plunger 181 to shift the forward-return valve as hereinbefore described. The spindle then begins rearward movement which continues until the stroke trip 215 engages the shut-off stop 213. This moves the trip rod 207 rearward to actuate a stop valve in a manner to be described. The trip rod 207 is provided with a shoulder at its rearward end which defines a limiting position for the shut-off stop 213 and also serves as a safety feature to assure shut-off of the tool in the event the shut-off stop 213 should become loosened from the trip rod.

The thrust control trip 223 mounted on the return rod 209 cooperates with the previously described torque clutch, in the spindle feed control mechanism, to provide a thrust control for the tool. FIGURES 3 and 5 particularly show the relation of the thrust control trip and the clutch plate 97. Resistance to rotation of the cutting element, and therefore of the spindle, is not reflected in the spindle feed control mechanism but is reflected in a tendency to slow down or stall the motor 17, which would correspondingly effect the longitudinal movement of the spindle. Resistance to feed of the cutting element is immediately reflected in resistance to rotation of the sleeve 33 with respect to the screw 25. More particularly, the sleeve, which is rotating faster than the screw, is attempting to feed the screw forward. If the normal feed rate of the screw is retarded by an increased resistance to forward thrust appearing at the cutting element, an inclined plane effect occurs which tends to force the sleeve threads to ride up the screw threads. Since the structure of the tool prevents this, the reaction force from the inclined plane effect appears as a torque reaction or resistance to turning of the sleeve 33. Since the sleeve is driven through the torque clutch, consisting of the ball clutch driver 93, the rapid advance planetary cage 95, the clutch plate 97 and associated mechanism, the torque reaction at the sleeve 33 will actuate the torque clutch. The torque reaction will result in a retarding of the cage 95 with respect to the clutch driver 93. This effects a camming of the balls out of the planetary cage recesses and movement of the clutch plate 97 and its associated mechanism forward, against the force of spring 99. The forward movement of the clutch plate 97 causes corresponding forward movement of the thrust control trip 223, which, through the return rod 209, moves the reversing trip 217 forward to actuate the trip plunger 181 and shift the forward-return valve 153 to return position. Hence, there is provided an automatic thrust control which will function at any point in the forward stroke of spindle movement. It will be seen from the foregoing description that the torque clutch in the spindle feed control mechanism provides an accurate control for increased thrust reaction at the tip of the cutting element, and a control which is adjustable over a wide range by the adjustment nut 109.

The control for shifting the tool from "advance" to "feed" condition includes a rapid advance trip bar 225, which is located in the forward portion of the housing recess 197. The trip bar 225 is an elongated bar having an inverted L-shaped cross section. This bar lies over the return rod 209 and bears against the trip plunger 173 of the advance-feed valve. The trip plunger 173 is also provided with a screw and lock-nut assembly 227 for the purpose of fine adjustment of the length of the trip plunger. The lower edge of the rapid advance trip bar 225 is pivoted with respect to the housing by means of pins 229. A rapid advance trip 231 is mounted in the dove tail groove of the trip bar 201 and may be positioned at any desired point on the trip bar by means of a set screw. The rapid advance trip 231 is located, with respect to the rapid advance trip bar 225, so that, as the trip bar 201 is carried forward along with the spindle 27, the rapid advance trip bar 225 will be cammed by the trip 231 to actuate the trip plunger 173 and shift the advance-feed valve into "feed" position. Since the rapid advance trip 231 is adjustable, any selected portion of the spindle stroke may be used for either "advance" or "feed."

FIGURES 8 and 9 particularly illustrate a motor valve assembly 233, a stop valve assembly 235 and an emergency return trip 237, all of which are contained in the valve block 39. Referring to FIGURE 1, air is supplied to the tool through a hose connection attached to a suitable fitting mounted in opening 239 in the handle 41. Air is then directed, in the handle, through passage 241 to passage 243 in the valve block. Another portion of passage 243 appears in FIGURES 8 and 9. The motor valve assembly 233 comprises a spool valve 245 mounted for reciprocating movement in a stepped cylindrical valve chamber 246 within the valve block 39. The spool valve serves to communicate the passage 243 with a passage 247 which directs air to the motor 17 and to the passage 183, which directs air to the control valves 153 and 151. The spool valve seats against a shoulder 248, defined by the valve chamber 246 to interrupt communication between the passages 243 and 247.

The rearward end of the spool valve rides in a guide 249, secured in the chamber 246, and a retainer 251 with the guide 249, seals the rearward end of the valve chamber. A retainer 253 seals the forward end of the valve chamber. The spool valve 245 is shifted by bleeding air from a forward end chamber 254 or a rearward end chamber 252 defined between the ends of the spool valve and the respective retainers. The spool valve is provided with an axial passage 255, communicating the two end chambers, and a transverse passage 257 which communicates the axial passage 255 with the valve chamber 246 to the rear of the shoulder 248. By means of these two passages, pressurized air is directed to the two end chambers at all times when the tool is connected to an air supply. Due to balanced piston areas, the spool valve is not shifted by pressurized air in the valve chamber 246, but is only shifted by bleeding air from one or the other of the end chambers.

A seal valve 259, comprising a head and stem, is mounted for limited axial movement in an axial bore in the rearward retainer 251 to seat against the forward face of the retainer to control the bleeding of air from the rearward end chamber 252. This seal valve is biased in a forward direction, to unseat the valve, by means of a spring. A relatively large axial bleed passage 261 is provided in the stem of the seal valve 259, opening from the stem adjacent to the head, and a small bleed passage 263 communicates the forward face of the seal valve head with the large bleed passage 261. A passage 265 in the handle 41 communicates the rearward end of the motor valve assembly 33, and bleed passage 261, with the start valve 43, to be described.

A seal valve 267, comprising a head and stem, is mounted for limited axial movement in an axial bore in the forward retainer 253 to seat against the rearward face of the retainer and is biased rearwardly, to unseat the valve, by a spring. This seal valve is provided to control the bleeding of air from the forward end chamber 254 of the motor valve assembly. An axial bleed passage 269 is provided in the stem of the seal valve 267 opening from the stem adjacent to the valve head. The functions of the seal valves will be described subsequently in connection with the operation of the motor valve assembly.

The stop valve assembly 235 includes a stop valve stem 271 and a stop valve spool 273, both mounted for limited reciprocating movement in a stepped cylindrical valve chamber 274 in the valve block 39. The stem 271 seals adjacent its forward end with the chamber 274. A retainer 275, at the rearward end of the chamber, seals the stem and the chamber. The stop valve spool 273 is mounted over the stop valve stem 271 and is sealed at its rearward end with the chamber walls. A passage 276 in the stem 271 communicates the chamber 274 at either end of the valve spool 273. The forward end of the spool is adapted to seal against the stem to close off the forward end of the passage 276. A seal is provided intermediate the ends of the valve spool to seat against a shoulder 277 of the valve chamber 274. A spring 279 biases the stop valve spool 273 forwardly to effect either the seal with the stem or the seal with the shoulder 277. A passage 281 to the rear of shoulder 277 communicates the valve chamber 274 with atmosphere. A passage 285 communicates the motor valve chamber 246, rearward of the shoulder 248, with the stop valve chamber 274, rearward of the stop valve spool 273. Accordingly, pressurized air is directed to the stop valve chamber behind the stop valve spool at all times when the tool is connected to an air supply.

The forward end of the motor valve assembly 233 is closed by a valve cover plate 287 including a passage which communicates the forward end of the motor valve assembly, and the seal valve bleed passage 269, with a passage 289 opening into the stop valve chamber 274 forward of the shoulder 277.

The stop valve stem 271 is actuated by a T-shaped arm 291 which is fixed to the rearward end of the control rod 207. The arm 291 is disposed to engage the forward end of the stop valve stem 271 and the forward end of the emergency return trip 237, to be described. The arm 291 is also shown in FIGURE 5.

Referring to FIGURE 1, the start valve 43 is a simple bleed or poppet type valve comprising a bushing 295 secured in a bore in the handle 41 and defining a chamber and valve seat at the inner end of the bore. A stem 297, extending through the bushing, defines a valve to seal the above mentioned chamber; and a spring urges the stem outwardly to seat the valve. A button 299 is pinned to the outer end of the stem for the purpose of moving the stem inward against the force of the spring. When the valve is unseated, the chamber is communicated with atmosphere by a bleed area between the stem and bushing. The start valve chamber is communicated with the rearward end of the motor valve assembly 233 by means of the passage 265, also shown in FIGURES 8 and 9.

An emergency stop valve 301 is identical in structure to the start valve 43. This valve is mounted in the valve block 39 and its operating button 303 is shown in FIGURES 8 and 9. The emergency stop valve chamber is communicated with the forward end chamber 254 of the motor valve assembly 233 by a passage 302.

The operation of the motor valve assembly 233, the start valve 43, the stop valve assembly 235 and the emergency stop valve 301 will now be described in detail. In FIGURE 8, the elements of the motor valve assembly and of the stop valve assembly are shown at the end of an operating cycle, or prior to the beginning of an operating cycle. The motor spool valve 245 is shifted forward and is seated against the shoulder 248 to cut off communication between passages 243 and 247. The seal valve 267 is seated against the forward retainer 253 by the motor spool valve. The spindle 27 is in its rearwardmost position and, through the shut off stop 213, the trip rod 207 holds the arm 291 in a rearwardmost position and this, in turn, holds the stop valve stem 271 and stop valve spool 273 in rearward positions. The stop valve spool 273 is then unseated from the valve shoulder 277. With these conditions, the forward end of the motor valve assembly 233 is communicated to atmosphere through the valve plate 287, the passage 289, the stop valve chamber 274, and the passage 281.

Before the motor spool valve can be shifted rearwardly to start an operating cycle, air pressure must be built up in the forward end chamber 254. This air is supplied to both end chambers, when the tool is connected to an air supply, through the handle 41, passage 243, motor valve chamber 246 behind the shoulder 248, and passages 257 and 255. Since, as above described, the forward end of the motor valve assembly 233 is communicated with atmosphere, the seal valve 267 must be seated against the retainer 253 to permit the pressure build up in the end chamber 254. The seal valve is initially seated against the retainer by the motor spool valve; however, after pressure builds up in the chamber 254, it will be maintained in this position by differential pressure across the seal valve until the pressure is equalized.

Since the stop valve chamber 274, behind the stop valve spool 273, is communicated with pressurized air through the passage 285, the stop valve spool and stop valve stem 271 are urged forwardly but are held against movement by the arm 291. The forward end of the stop valve stem passage 276 is sealed by the stop valve spool.

To start a tool cycle, the rearward end chamber 252 of the motor valve assembly is bled through the passage 261 in the seal valve 259 and the passage 265 by depressing the start valve button 299. This causes the motor spool valve 245 to shift rearwardly, unseating the valve from the shoulder 248, to communicate the passages 243 and 247 and direct pressurized air to the motor 17 and the control valves 153 and 151. When the motor spool valve shifts to the rear, the seal valve 259 is seated against the retainer 251. The seal valve 259 is necessary to permit further functioning of the valve assembly 233 in the event that the operator should hold open the start valve 43. In this event it might be impossible to again build up pressure in the end chamber 252 for the purpose of subsequently shifting the spool valve forward. Accordingly, the seal valve 259 permits this pressure build up in that the small bleed passage 263 through the head of the seal valve restricts the flow of air from the chamber 252, should the start valve be held open. In addition, the bleed passage 263 permits the pressures to equalize on both sides of the seal valve after the start valve has been permitted to close, by the operator. This pressure equalization is necessary to permit the seal valve to open to later effect rapid bleed of the chamber 252 through the larger passage 261.

As the spindle 27 begins forward movement, the trip bar 201 moves forward permitting forward movement of the trip rod 207 and the arm 291. The stop valve spool 273 then moves forward under the urging of the pressurized air and the spring 279, until the spool seats against the shoulder 277 to cut off communication between the passages 289 and 281. The forward end of the motor valve assembly 233 is now closed to atmosphere, but is also closed to pressurized air. Since the end chamber 254 is pressurized, the seal valve 267 remains seated against the retainer 253 due to differential air pressure and, with this condition, it is impossible to later bleed the chamber 254 to again shift the spool valve forward.

To accommodate this situation, after the stop valve spool 273 seats on the shoulder 277, the stop valve stem 271 moves forward with respect to the stop valve spool, due to pressurized air directed through passage 276 and a piston effect, to break the seal between these members. The valve stem 271 moves to the forward limiting position shown in FIGURE 9 and moves the arm 291 to the position shown. Pressurized air is now directed to the forward face of the head of the seal valve 267 through the passage 276, the passage 289, the valve cover plate 287, and the passage 269 in the seal valve 267. The pressures on the seal valve 267 are then equalized and the valve is opened by the seal valve spring. With the valve open, the end chamber 254, of the motor valve assembly, is then communicated with the stop valve chamber 274 forward of the shoulder 277, but is sealed off from the exhaust passage 281. The elements of the motor valve assembly and the stop valve assembly are now in the positions shown in FIGURE 9.

The end chamber 254 of the motor valve assembly 233 is in continuous communication with the emergency stop valve 301, through the passage 302. It will be seen then that, at any time during the operating cycle, the emergency stop valve may be actuated to bleed the end chamber 254 to shift the motor spool valve forward to completely stop the operation of the tool.

In normal operation, however, the spindle will move through its forward and return strokes and, at the end of the return stroke, the trip bar 201 through the trip 215 will engage the shut off stop 213 to effect rearward movement of the trip rod 207 and the arm 291. The arm 291 moves the stop valve stem 271 rearward. The stem 271 first seals with the forward end of the stop valve spool 273, to cut off communication of the motor valve end chamber 254 with pressurized air directed through the stop valve stem passage 276; then moves the stop valve spool 273 rearwardly to unseat the spool from the shoulder 277 to communicate the end chamber 254 to atmosphere through the passage 281. This bleeds the end chamber 254 to shift of the motor spool valve 245 forward to seat against the shoulder 248 and cut off communication between the passages 243 and 247, which shuts off air to the motor 17 and the control valves.

The valve housing 39 also houses the emergency return trip 237 in a longitudinal bore. The trip 237 comprises a pin 305 having an enlarged forward head 307 and a button 309 pinned to its rearward end. A spring 311 biases the emergency return trip rearwardly. The emergency return trip is operated manually by pressing the trip forward to engage the arm 291 and move the trip rod 207 forward. This moves the reversing trip 217 forward through the return rod 209 and trips the trip plunger 181 to shift the forward-return valve 153 to effect return of the spindle. The emergency return trip will be effective at any stage of the forward stroke of the spindle to move the arm 291 forward from the position shown in FIGURE 9.

FIGURE 10 shows diagrammatically the pneumatic circuit of the tool and will be referred to in the following discussion of the overall tool operation. To start the tool cycle, the start valve 43 is actuated by an operator and this effects a shifting of the motor spool valve 245 to the rear to communicate the passage 243 with the passage 247 to deliver pressurized air to the motor 17 and the forward-return valve 153. The forward-return valve is in "forward" position and therefore directs pressurized air to the advance-feed valve 151 through the passage 189. The advance-feed valve is in "advanced" position and therefore directs air to the chamber 133 through the passage 195. The piston 131 is then actuated to lock the ring gear 115 and the spindle feed control mechanism drives the spindle forward at "advance" rate.

When the spindle has moved forward a predetermined distance, determined by the position of the rapid advance trip 231 on the trip bar 201, the rapid advance trip engages the rapid advance trip bar 225 to actuate the trip plunger 173 which shifts the advance-feed valve to "feed" position. Air is now exhausted from the chamber 133 and is directed to the chamber 129 to actuate piston 123 which locks the disc clutch 117, 119 and the spindle feed control mechanism drives the spindle forward at "feed" rate.

At the end of the forward stroke of the spindle, which is determined by the position of the return stop 211 on the trip bar 207, the trip 215 engages the return stop 211 to shift the trip rod 207, the return rod 209, and the reversing trip 217 forward. The reversing trip actuates the trip plunger 181 to shift the forward-return valve to "return" position. The advance-feed valve is now exhausted to atmosphere, as is the chamber 129, and air is directed through the passage 185 to the chamber 147. This actuates the piston 143 to engage the teeth of the piston and of the return clutch 137, in the spindle feed control mechanism, to stop rotation of the gear 137 and the sleeve 33; and the spindle begins return movement.

The end of the return stroke is determined by the position of the shut off stop 213 on the trip rod 207. The trip 215 engages the shut off stop 213 to move the trip rod 207 and arm 291 rearward. This shifts the stop valve stem 271 and stop valve spool 273 rearward to bleed the forward end chamber 254 of the motor valve assembly. The motor spool valve 245 then shifts forward to seat against the shoulder 248 and cut off communication between the passages 243 and 247. This shuts off air from the motor 17 and the forward-return valve 253, so that the tool stops and the forward-return valve returns to its "forward" position. This completes the cycle and the tool elements are in position for a succeeding cycle.

A feature of the above described tool is that it is particularly adapted for remote control operation. Since the start valve 43 and the emergency stop valve 301 are bleed or poppet type valves these valves may be readily placed at remote locations and connected to the tool by suitable conduits attached to the tool at the described positions for these valves.

Another feature of the tool is a simple and effective mechanism for reversing the feed of the spindle in response to a predetermined thrust reaction at the cutting element.

A further feature of the tool is the simple and effective gearshift mechanism.

What is claimed is:

1. A power operated positive feed tool comprising, in combination: a housing; a drive shaft rotatable in said housing; a screw drivingly connected to said drive shaft for rotation thereby and for axial movement relative thereto; a spindle for mounting a cutting element drivingly connected to said screw; a threaded sleeve rotatably mounted in said housing for threaded engagement with said screw; a drive mechanism connected between said drive shaft and said sleeve for controlling the rotation of said sleeve relative to said screw to effect the extension and retraction of said spindle relative to said housing; first, second, and third air operated means selectively actuable to control said drive mechanism; each of said operated means being actuated when communicated with pressurized air, while the other of said air operated means are vented; a first control valve for alternatively directing air to, and venting air from, said first and second air operated means respectively; a second control valve for alternatively directing air to, and venting air from, said first control valve and said third air operated means respectively; and control means associated with said spindle for actuating said control valves in response to axial movement of said spindle.

2. The invention set forth in claim 1 wherein said control valves are four-way valves.

3. The invention set forth in claim 1 wherein each of said control valves comprises: means defining a chamber for communication with an air supply, a valve member movable in said chamber having a pressure surface sealed from said chamber in one operative position of said valve member, means continuously urging said valve member to said one operative position, and trip means for displacing said valve member from said one operative position to communicate said pressure surface with said chamber thereby to effect movement of said valve member to the other operative position.

4. The invention set forth in claim 1 wherein said feed mechanism comprises a hollow feed output shaft drivingly connected to said sleeve and including a pinion, a feed drive shaft journaled within said feed output shaft and drivingly connected to said drive shaft, a cage drivingly connected to said feed drive shaft and carrying idler gears, a rotatably mounted ring gear, said idler gears meshing with said ring gear and said feed output shaft pinion, and a disc clutch comprising interengaging discs drivingly connected to said ring gear and said feed output shaft pinion respectively; said first air operated means being actuable to prevent rotation of said ring gear; said second air operated means being actuable to engage said disc clutch; and said third air operated means being actuable to prevent rotation of said feed output shaft.

5. A power operated positive feed tool comprising in combination: a housing; a drive shaft rotatable in said housing; a screw drivingly connected to said drive shaft for rotation thereby and for axial movement relative thereto; a spindle for mounting a cutting element drivingly connected to said screw; a threaded sleeve rotatably mounted in said housing for threaded engagement with said screw; a drive mechanism connected between said drive shaft and said sleeve for controlling the rotation of said sleeve relative to said screw; a first air operated clutch means in said drive mechanism, selectively actuable to effect rotation of said sleeve for rapid extension of said spindle; second air operated clutch means in said drive mechanism, selectively actuable to effect rotation of said sleeve for slow extension of said spindle; air operated brake means selectively actuable to stop rotation of said sleeve for retraction of said spindle; each of said air operated means being actuated when communicated with pressurized air, while the other of said air operated means are vented; a first four-way valve for alternatively directing air to, and venting air from, said first and second air operated clutch means respectively; a second four-way valve for alternatively directing air to, and venting air from, said brake means and said first four-way valve respectively; and control means associated with said spindle for selectively actuating said valves in response to axial movements of said spindle.

6. The invention set forth in claim 5 including a thrust control mechanism comprising: a torque responsive clutch in said feed mechanism; said clutch being disengageable in response to excessive resistance to turning of said sleeve, resulting from resistance to extension of said spindle; and control means responsive to disengagement of said clutch to actuate said second four-way valve to effect retraction of said spindle.

7. In a power operated tool, the combination comprising: a housing; a driveshaft rotatable in said housing, a screw drivingly connected to said driveshaft for rotation thereby and mounted for axial movement relative to said drive shaft and to said housing; a spindle for mounting a cutting element nonrotatably fixed to said screw; a threaded sleeve rotatably mounted and axially fixed in said housing, in threaded engagement with said screw; a thrust control mechanism for said spindle comprising an auxiliary drive mechanism drivingly connected to said driveshaft for driving said threaded sleeve; said auxiliary drive mechanism including a change speed mechanism, for driving said sleeve at different speeds with respect to said screw, to advance and retract said screw relative to said sleeve, and a torque responsive clutch drivingly connected in said auxiliary drive mechanism; said torque clutch being disengageable in response to predetermined resistance to rotation of said sleeve with respect to said screw; said resistance to rotation of said sleeve resulting from resistance to advance of said screw; and a control mechanism actuated by disengagement of said torque clutch for actuating said change speed mechanism to retract said screw.

References Cited in the file of this patent

UNITED STATES PATENTS

| | | |
|---|---|---|
| 443,259 | Pedersen | Dec. 23, 1890 |
| 1,370,378 | Starr | Mar. 1, 1921 |
| 2,181,055 | Hirvonen | Nov. 21, 1939 |
| 2,391,487 | Shader | Dec. 25, 1945 |
| 2,781,616 | Estabrook | Feb. 19, 1957 |
| 2,791,922 | Robinson | May 14, 1957 |
| 2,854,869 | Hirvonen | Oct. 7, 1958 |
| 2,869,403 | Bent | Jan. 20, 1959 |
| 2,893,272 | Linsker | July 7, 1959 |